United States Patent [19]
Hammel et al.

[11] 4,002,446
[45] Jan. 11, 1977

[54] GLASS BEAD FORMING METHOD

[75] Inventors: Joseph J. Hammel, Pittsburgh, Pa.;
Eugene J. Cone, Yorba Linda, Calif.

[73] Assignee: PPG Industries, Inc., Pittsburgh, Pa.

[22] Filed: Sept. 2, 1975

[21] Appl. No.: 609,631

[52] U.S. Cl. .................................. 65/21; 65/116
[51] Int. Cl.² .................................. C03B 19/10
[58] Field of Search ............... 65/21, 116; 264/15

[56] References Cited
UNITED STATES PATENTS

| | | | |
|---|---|---|---|
| 3,242,032 | 3/1966 | Schott | 65/21 X |
| 3,245,866 | 4/1966 | Schott | 65/21 X |
| 3,442,988 | 5/1969 | Williams | 65/21 X |
| 3,597,177 | 8/1971 | Davidoff | 65/21 |
| 3,843,340 | 10/1974 | Cone | 65/21 |

*Primary Examiner*—Robert L. Lindsay, Jr.
*Attorney, Agent, or Firm*—Dennis G. Millman

[57] ABSTRACT

Spherical regularity of glass beads is improved by catching a falling stream of hot beads in a bath of liquid quenching medium having a relatively low heat transfer coefficient controlled by maintaining a relatively high viscosity.

5 Claims, 3 Drawing Figures

GLASS BEAD FORMING METHOD

BACKGROUND OF THE INVENTION

This invention relates to an improvement in the process for producing glass beads described in U.S. Pat. No. 3,843,340 to Eugene J. Cone, entitled "Method and Apparatus for Producing Glass Beads." In that process, glass is melted to a low viscosity and forced through a small-diameter orifice to form a jet which breaks apart into beads as it falls through air. Because it would require an impractical falling distance through air for the glass beads to cool sufficiently to solidify, the beads are caught in a bath of liquid quenching medium after a drop of a few meters or less. As the still-soft beads contact the surface of the quenching liquid, however, there is usually sufficient impact force to flatten the beads somewhat. The resultant lack of spherical regularity in the beads can be objectionable in connection with some end uses for the beads.

Attempts to reduce the impact force on the beads as they enter the quenching liquid by reducing the viscosity of the liquid or by further shortening the drop height have failed to eliminate flattening of the beads, and in some cases have unexpectedly made flatter beads. Thus it would be desirable if some means were available for catching molten glass beads within a practical drop height which would yield substantially spherical beads.

SUMMARY OF THE INVENTION

It has now been found that, while it is very difficult if not impossible to avoid some flattening of the beads as they strike the surface of the quench liquid within a practical falling distance, the quench batch can be provided with conditions which permit the flattened beads to regain their spherical shape by means of surface tension. In particular, the rate of heat transfer in the quench bath should be kept low so that the beads lose heat slowly and thereby remain in a softened state long enough to resume a nearly spherical shape. In the case of quenching oils, which are preferred as the quenching medium, it was discovered that reducing the temperature of the quench bath so as to increase the viscosity of the oil caused less flattening of the beads. This result is quite surprising in view of the expectation that a more viscous liquid would cause a greater flattening of the beads upon impact and that a lower oil temperature would cool the beads more rapidly. The optimum heat transfer rate is maintained by selecting an appropriate quenching liquid and by heating or cooling the bath to provide an appropriate viscosity.

THE DRAWINGS

DETAILED DESCRIPTION

Figure 1:
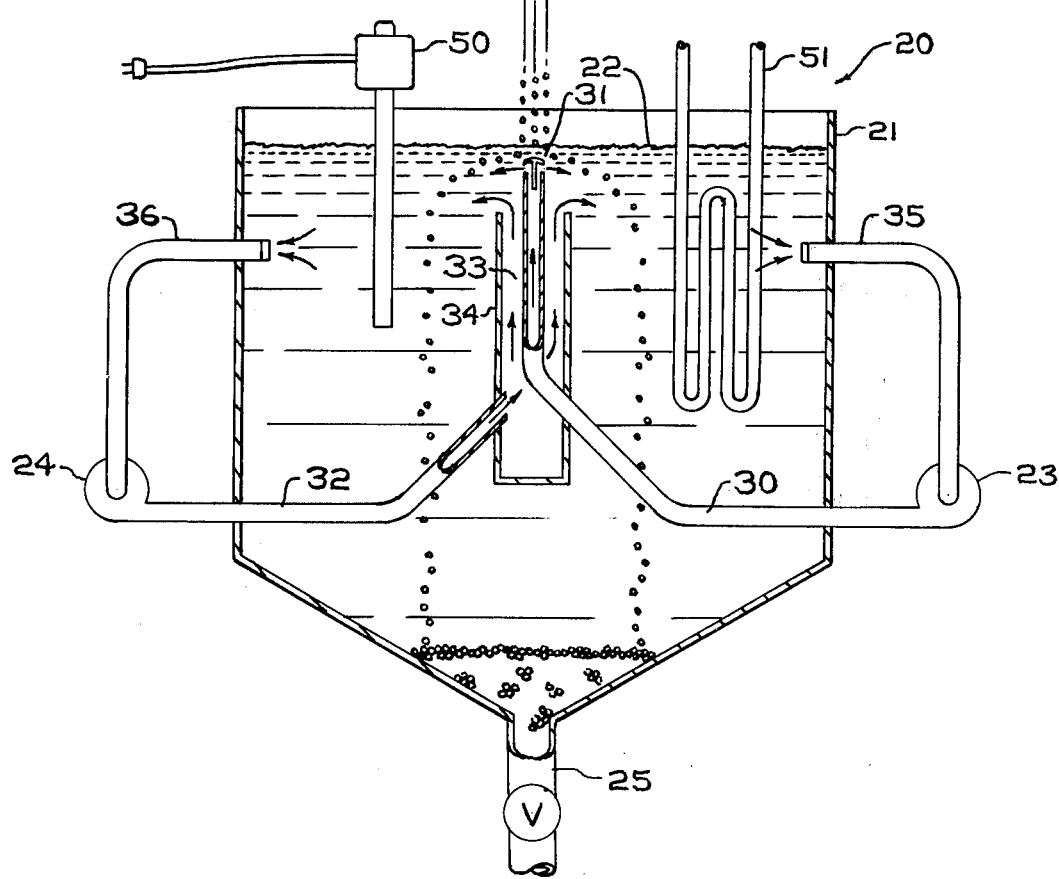
FIG. 1 is a cross-sectional view of a glass melting furnace with bead forming means and a circulating liquid quenching bath of a preferred design.

In FIG. 1 there is shown an overall glass bead-making operation in which glass is melted in a furnace 10 and forced through orifices in a neck 11 to form a plurality of jets 12. The jets dissociate into beads solely due to flow irregularities and surface tension, and the beads are caught in a quenching bath 20. Details of suitable melting and bead-forming operations can be found in U.S. Pat. No. 3,843,340 to Eugene J. Cone, the disclosure of which is hereby incorporated by reference. Other structural details of the furnace 10 and neck 11 are disclosed in U.S. application Ser. No. 488,116, filed July 12, 1974, now abandoned, by Richard A. Caripolti, the disclosure of which is also incorporated by reference. Other specific furnace designs will lend themselves to use with the present invention, therefore the furnace 10 and neck 11 are shown somewhat schematically in the drawings here. Three representative jets of glass 12 are shown in the drawings, but it should be apparent that a larger or smaller number could be employed. In the preferred embodiment, ten or more jets are employed and are arranged in a circle.

Figure 2:
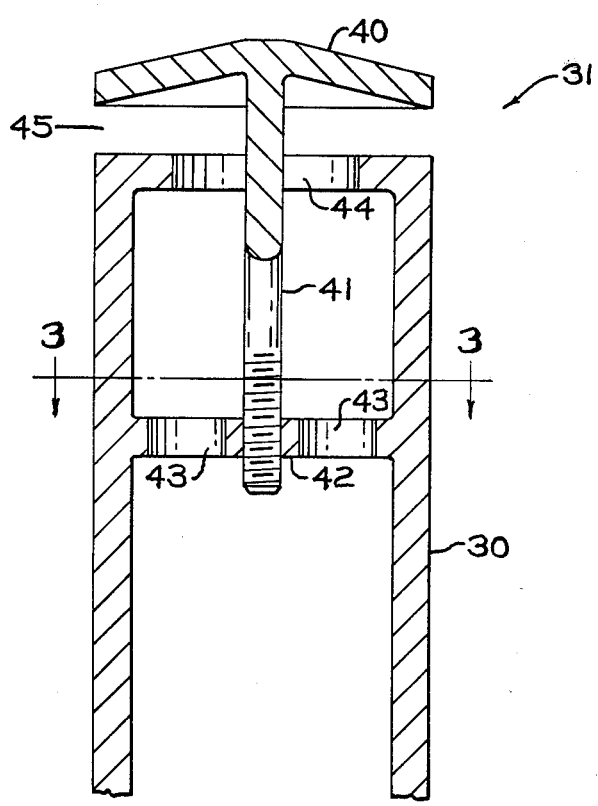
FIG. 2 is an enlarged cross-sectional view of a liquid spray nozzle employed in the quenching bath of FIG. 2.
Figure 3:
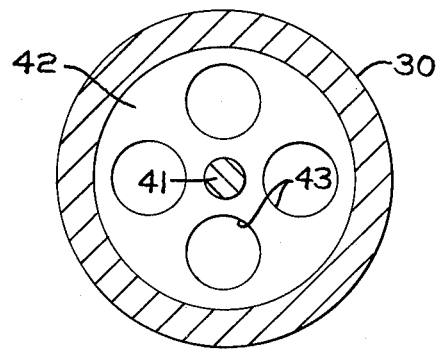
FIG. 3 is a horizontal section taken along lines 3—3 in FIG. 2, showing details of the spray nozzle.

The specific quenching bath arrangement shown in FIG. 1 is a preferred embodiment, and is the subject of U.S. application Ser. No. 609,646, filed on even date herewith by Eugene J. Cone. The bath 20 includes a tank 21 holding a quantity of quenching liquid 22 and pumps 23 and 24 for circulating the quenching liquid. The beads fall to the bottom of tank 21 where they accumulate and are periodically discharged through a valved bottom outlet 25. Although not essential to the present invention, the quenching bath shown in the drawings provides for an advantageous, dual, concentric circulation pattern. One fluid input line 30 supplies a submerged, high velocity, radial flow nozzle 31, while another line 32 supplies a large-volume, annular passage 33 defined by a sheath 34. The high velocity radial flow from nozzle 31 quickly removes the beads from the path of the glass jet so as to prevent one bead colliding with another. The large volume flow from annulus 33 provides the mass transfer needed to avoid localized over-heating of the quenching bath. The fluid is recirculated via return lines 35 and 36. Details of nozzle 31 may be seen in FIGS. 2 and 3. Cap 40 is fitted over the open upper end of pipe 30 by means of a threaded stem 41 which screws into a cross member 42. The quenching liquid passes upwardly through bore 43 in cross member 42, through opening 44 at the top of pipe 30, and then radially outward through a space 45 between cap 40 and the top of pipe 30.

The quenching bath is provided with heating means, such as electric heater 50, and cooling means, such as water pipe 51, for controlling the temperature of the quenching liquid and thereby selecting a suitable viscosity and heat transfer coefficient.

A variety of known quenching liquids are suitable for use with the present invention and, as a class, are generally characterized by relatively low flash points, resistance to decomposition at high temperatures, ease of pumping, and lack of solvent or chemical action on the articles being treated. Furthermore, it has now been found important that the quenching liquid be capable of exhibiting a relatively low heat transfer coefficient as will be fully discussed below. These requirements can be met, for example, with the class of fluids known as "quenching oils." These include silicon types and paraffinic types, the latter being preferred for easier removal from the surfaces of the glass beads. A specific paraffinic quenching oil with which the invention has been successfully practices is commercially available as "Gulf 412 Martempering Oil" from the Gulf Oil Corporation, which has the following properties:

| | |
|---|---|
| Gravity, ° API | 26.4 |

-continued

| | |
|---|---|
| Viscosity, poises | |
| at 100° F. (38° C.) | 5.1 |
| at 210° F. (99° C.) | 0.24 |
| Viscosity Index | 96 |
| Flash, OC | 600° F. (315° C.) |
| Fire, OC | 680° F. (360° C.) |
| Pour point | 0° F. (−18° C.) |
| Neutralization Value, ASTM D-974, total Acid No. | 0.03 |

The viscosity of these oils is generally highly temperature-dependent (inversely), and the heat transfer coefficient is in turn a function of the viscosity.

It has been found that a key factor in assuring spherical regularity of the glass beads is the provision of a sufficiently low rate of heat transfer from the beads to the quenching liquid to enable the flattened geads to reform into spheres by means of surface tension before they lose enough heat to solidify. The temperature of each bead should remain above its softening point for at least a moment while the quench bath. The maximum heat transfer rate will depend upon a number of factors, such as the size, temperature, and viscosity of the beads as they enter the quenching bath, which in turn depend on the specific glass composition, drip height, and temperature in the melter. The only lower limit for the rate of heat transfer is that the beads must cool sufficiently to solidify before they contact one another at the bottom of the quench tank. This again depends upon the particular glass composition and the condition of the beads as they enter the quenching bath, as well as the depth of the tank. However, the viscosity should not be made so great as to cause the molten glass beads to break up when they strike the surface of the quenching liquid.

It might be expected that the beads would remain in a softened condition longer if the quenching liquid were maintained at a maximized temperature, but such was not found to be the case. The following table shows the results of three trial runs using a glass composition of the type disclosed in U.S. patent application Ser. No. 447,199, filed Mar. 1, 1974, by Joseph J. Hammel and Ties Allersma, now U.S. Pat. No. 3,923,533 the disclosure of which is hereby incorporated by reference. These compositions are adapted for subsequent phase separation and leaching to form high silica, microporous articles suitable for use as catalyst supports, and are all suitable for bead-forming in accordance with the present invention. The specific glass composition used in Examples 1 through 4 consisted essentially by weight of approximately 40.0% $SiO_2$, 9.5% $Na_2O$, and 50.5% $B_2O_3$. The glass temperature at the neck of the melter was about 1250° C. the quenching liquid was the abovedescribed Gulf 412 oil, and the average bead diameter was about 5 millimeters.

From the Examples, it can be seen that higher temperatures produced flat beads at widely varying drop distances, but lower temperatures yielded round beads. It is believed that the lower heat transfer coefficient, caused by the higher viscosity, is responsible for the improvement at a reduced temperature. The heat transfer coefficient is apparently the dominating factor in the heat transfer rate, and thus the beads actually stay hotter longer in a cooler quench bath. In the case of the specific glass composition and temperature used in Examples 1 through 4, a heat transfer coefficient for any quenching as high as about 25 BTU/hr/ft$^2$/° F. (122 Kcal/hr/m$^2$/° C.) is deemed satisfactory for producing beads which are nearly spherical. Using the Gulf 412 oil, this corresponds to a maximum temperature of about 80° C.

Although no difficulty due to excess viscosity at room temperature or substantially lower would be expected with most quenching oils, it is preferred to heat the oil at least slightly to reduce the pumping load. Moreover, in an extended production run, heat from the beads may tend to raise the temperature of the bath above the maximum thereby necessitating cooling of the bath in order to maintain the heat transfer conditions necessary for forming spherical beads. Thus the arrangement shown in FIG. 1 includes both heating means 50 and cooling means 51, but it should be evident that for some quenching liquids, the heater would be optional, while in other cases the cooling means will not be required.

While the advantages of the present invention have been described herein in terms of producing spherical shapes, it should be understood that the beads produced need not be perfectly spherical in order to constitute an improvement. A slight degree of imperfection may be unavoidable in a substantial portion of the beads produced in accordance with the present invention, and a small portion of the beads may even be wholly irregular. In some cases, it may be acceptable, or even preferred, that the beads have an ellipsoidal shape, so that merely reducing the flatness of the beads may be adequate. Many of the beads made by this method have a single indentation or dimple, which has not been found objectionable. The expression "spherical regularity," as used herein, is not intended to preclude the presence of such minor deviations.

It is to be understood that other modifications and variations as are known to those of skill in the art may be resorted to without departing from the spirit and scope of the invention as defined by the appended claims.

We claim:

1. In the method of forming glass beads wherein a stream of molten glass is established which dissociates into falling droplets of molten glass, and said droplets are caught in a bath of quenching liquid before they

| | 1 | 2 | 3 | 4 |
|---|---|---|---|---|
| Drop Distance | 16 inches (41 centimeters) | 5 feet (1.5 meters) | 5 feet (1.5 meters) | 5 feet (1.5 meters) |
| Viscosity, poises | 0.2 | 0.2 | 2.6 | 0.6 |
| Temperature ° C. | 110 | 110 | 50 | 80 |
| Heat Transfer Coefficient, BTU/hr/ft$^2$/° F. (Kcal/hr/m$^2$/° C.) | 40 (195) | 40 (195) | 10 (49) | 25 (122) (estimated) |
| Shape | flat | flat | round | football | have cooled to a temperature below their softening point, whereby the beads flatten upon impact with the liquid, the improvement comprising:

using as the quenching liquid a liquid whose viscosity is an inverse function of temperature, thermally controlling the viscosity of said liquid by extracting heat from the quenching bath with cooling means, and thereby modulating the viscosity of the liquid to maintain the rate of heat exchange from the beads to the liquid below a predetermined maximum rate so that the beads remain at a temperature above their softening point for a sufficient period of time after entering the quenching liquid to enable their assuming a substantially regular spherical shape.

2. The method of claim 1 wherein the quenching liquid is a quenching oil.

3. The method of claim 2 wherein the quenching oil is circulated in the quenching bath and is maintained at a temperature above ambient.

4. The method of claim 3 wherein the beads are formed from an alkali borosilicate glass capable of being phase separated.

5. The method of claim 4 wherein the viscosity of the quenching oil is controlled so as to maintain a heat transfer coefficient of less than about 122 Kcal/hr/m$^2$°C.

* * * * *